3,306,758
COMPOSITION AND METHOD FOR
STABILIZING SOIL
George A. Miller, Painesville, Ohio, assignor to Diamond Alkali Company, Cleveland, Ohio, a corporation of Delaware
No Drawing. Filed July 1, 1963, Ser. No. 292,124
19 Claims. (Cl. 106—84)

This invention relates to a method for controlling the release of ammonia vapors from alkali metal silicate-containing soil stabilizing compositions and new alkali metal silicate-containing compositions. More particularly, the present invention relates to a method for controlling the release of ammonia vapors by the incorporation of an aldehyde into the soil stabilizing composition.

In recent years, the use of liquid alkali metal silicate compositions to strengthen substrata, or render porous substrata impermeable to water, has become well known and widely used. Amides or substances capable of releasing ammonia are employed in the compositions as essential ingredients to produce gelation. When placed in the soil, the liquid composition forms an insoluble gel, having high strength, in a relatively short period of time thereby enabling excavation and construction work to be performed in recently treated soil. However, during gelation and thereafter, the amide or ammonia compound in the soil stabilizing composition liberates gaseous ammonia. The release of gaseous ammonia, particularly in confined areas, constitutes a hazard to those engaged in construction taking place in proximity to recently stabilized soil.

Accordingly, it is an object of this invention to provide a method for controlling the release of ammonia vapor from alkali metal silicate-containing gelable compositions.

A further object of this invention is to provide a new and improved alkali metal silicate-containing gelable composition characterized by substantial water insolubility and controllable gel time, which does not release ammonia vapors into the surrounding atmosphere.

These and other objects and advantages of the invention will appear more fully in the following description thereof.

This invention comprises a composition of matter and method of using such composition comprising a mixture of (1) an alkali metal silicate; (2) an amide and (3) at least one aldehyde selected from compounds having the structure:

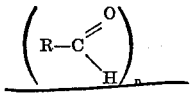

wherein R is selected from the group consisting of hydrogen and a hydrocarbon radical (aliphatic, straight or branched, cyclic or aromatic, saturated or unsaturated, substituted or unsubstituted) containing from about 1 to about 8 carbon atoms, and $n$ is an integer from 1 to 100, inclusive; the cyclic polymer of a lower alkyl aldehyde having the following structure:

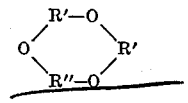

wherein R' is a lower alkyl radical of from 1 to 4 carbon atoms and R" is R' or —R'—O—R'—; mixtures of the above; or copolymers of aldehydes, particularly the lower alkyl aldehydes, e.g. formaldehyde and acetaldehyde, with other copolymerizable materials which, when in combination with the other components of the system are capable of combining with the released ammonia to form aldehyde-ammonia compounds. Thus, the term "aldehyde" is not only intended to include those compounds with a free aldehyde group, but also those compounds known as aldehyde donors, in which the aldehyde group may not be free before addition to the stabilizing mixture; the only limitation being that the compound must be capable of forming within the mixture an aldehyde which is in turn capable of forming an aldehyde-ammonia compound.

As used in the specification and claims, the term "alkali metal silicate" is intended to refer to alkali metal silicates having an alkali metal oxide:silicon dioxide weight ratio within the range of from about 1.0:3.0–4.0; notably sodium silicates having a sodium oxide:silicon dioxide weight ratio within the range of from about 1:3.0–4.0, preferably about 1:3–3.5. An especially preferred material is an aqueous sodium silicate having a sodium oxide:silicon dioxide ratio of about 1:3.2–3.3 and having an $Na_2O$—$SiO_2$ solids content of about 35 to 45 percent. The term "alkali metal," as used in the specification and claims, is intended to refer to the various alkali metals, i.e., sodium, potassium, lithium, rubidium, cesium and mixtures thereof. Silicates of potassium and sodium are more generally available. Because of their lower cost and availability, sodium silicates are more widely used and therefore are preferred in the practice of the present invention. Particular reference hereinafter is made to such silicates.

The amides which may be employed in compositions of this invention are those disclosed in U.S. Patent No. 2,968,572, issued January 17, 1961, to Cletus E. Peeler, Jr., hereby incorporated by reference, such amides having the structure

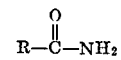

wherein R is selected from the group consisting of H, lower alkyl, —$CONH_2$ and lower alkyl-substituted amido groups. Specific illustrative amides are formamide, acetamide, propionamide and butyramide. A preferred amide is formamide (M.P. 2.5° C.).

The aldehydes which may be used in the practice of this invention are those which will combine with the released ammonia and form aldehyde-ammonia compounds. Specific examples of suitable compounds capable of combining with gaseous ammonia and intended within the scope of this invention are: formaldehyde, acetaldehyde, propionaldehyde, n-butyraldehyde, isobutyraldehyde, etc.; furfural; benzaldehyde, o-chlorobenzylaldehyde; the linear polymers of the lower alkyl aldehyde, e.g. paraformaldehyde (contains from 3 to 100 monomer units of formaldehyde, averaging about 30 and melts at from 120° to 170° C.); the cyclic polymers of lower alkyl aldehydes, for example, trioxane (a cyclic trimer of formaldehyde), paraldehyde (cyclic trimer of acetaldehyde), and metaldehyde (cyclic tetramer of acetaldehyde); mixtures of aldehydes, e.g. propionaldehyde-acetaldehyde, propionaldehyde-trioxane, trioxane-paraldehyde, and the like; and copolymers of formaldehyde and a carbohydrate, e.g. sucrose, glucose, starch, cellulose, and the like.

The method of this invention comprises the formation of aldehyde-ammonia compounds during gelation of the soil stabilizing composition, whereby gaseous ammonia is prevented from being released into the atmosphere surrounding the stabilized soil; for instance, when formaldehyde is the aldehyde and formamide the amide, the aldehyde-ammonia compound hexamethylenetetramine is formed.

This invention is especially concerned with compositions of an amide and silicate, but also comprises such compositions which additionally contain a reactive salt capable of rapidly reacting with the alkali metal silicate to form, with the silicate, a completely or substantially water-insoluble gel having an accelerated gel time. In some applications, for example, in the treatment of soil at a depth below the existing water level, ground moisture present could be a disadvantage in dissolving the initially-formed gel. Accordingly, in such a situation, it is a preferred practice of this invention that the silicate-amide-aldehyde composition employed contain a reactive salt for the purpose of imparting a high degree of initial water-insolubility to the initial gel formed from the four-component, i.e., silicate-amide-aldehyde-reactive salt composition. The term "reactive salt" is intended to mean those metal salts which chemically react with aqueous alkali metal silicate to produce a completely or substantially water-insoluble gel. Specific reactive salts include sodium aluminate, aluminum chloride, copper sulfate, zinc chloride and calcium chloride, with calcium chloride being preferred. When a reactive salt is used, it generally is incorporated as an aqueous solution with a concentration within the range of from about 25 g./liter up to saturation. It will be appreciated that, when no such reactive salt is employed, the inherent advantages of this invention of preventing the release of gaseous ammonia are achieved equally as well.

In the discussion of the invention thus far, it will be understood that the composition of this invention incorporates at least sufficient water to render the composition fluid. However, except in those instances where a dilute solution is desired for reasons of economy, substantial dilution is to be avoided. Generally, at least a portion of the necessary water may advantageously be incorporated by using a commercial aqueous alkali metal silicate, described above, with additional water being added, if desired, as by admixture of the water with the amide and/or reactive salt which may be employed.

It will be appreciated that the proportions of alkali metal silicate, amide, aldehyde, reactive salt and added water, as well as the amount of soil treated with a given quantity of such a composition varies widely depending upon the porosity, permeability and type of soil, nature of substrata, if subsoil applications are intended, and the like. Accordingly, it generally is not feasible to define in terms of proportions a composition which represents an optimum material for use in all types of soil solidification and/or stabilization operation.

However, effective soil stabilization compositions of the present invention comprise from about 5 to 97 percent, preferably about 35 to 75 percent, by volume, of the total composition of an aqueous alkali silicate, containing about 35 to 45 percent solids; about 2 to 30 percent, preferably 2 to 15 percent, by volume, of the total composition of an amide; about 0 to 50 percent, preferably about 5 to 20 percent, by volume, of the total composition of an aqueous solution of the reactive salt; and from about 1 to about 30 percent, preferably about 1 to about 20 percent, by volume, of the total composition of the aldehyde and the balance of the soil stabilizing composition being added water (water beyond that separately admixed with either alkali silicate, amide, reactive salt or aldehyde).

The release of gaseous ammonia takes place during and after gelation of the composition and continues for several days thereafter until the hydrolysis of the amide compound ceases. By decreasing the amount of the aldehyde below that required to combine with all of the ammonia released, an economic advantage is achieved. In this manner, ammonia vapor is prevented from escaping the gel for a given period of time after gelation as the particular situation requires. If one desires to prevent ammonia from being released from the composition into the atmosphere for only a short period of time, e.g. 24 to 72 hours after gelation, about 1 to 10 percent of additive compound, by volume of the soil stabilizing composition is required depending upon the amount of amide present. Longer periods of prevention of ammonia release can be attained by increasing tthe amount of aldehyde added, which will reach a maximum of about 30 percent by volume of the total composition.

The amount of aldehyde required to combine with the ammonia produced during the stabilizing operation can be calculated by determining the number of moles of ammonia released by the hydrolysis of the amide in the soil stabilizing composition, and then adding the number of moles of aldehyde required to form the aldehyde-ammonia compound. For instance, if formamide is the amide being used in the alkali metal silicate composition, and formaldehyde is the aldehyde used to control the release of ammonia, then 1.5 moles of formaldehyde would be required for each mole of formamide in the soil stabilizing composition to achieve 100 percent combination of the ammonia to form hexamethylene-tetramine.

Although this invention, in its preferred embodiment, comprises an alkali metal silicate-amide-reactive salt composition, it is not restricted to any single soil stabilizing composition. An aldehyde may be employed to prevent the release of gaseous ammonia in any soil stabilizing composition containing a siliceous solution capable of being solidified by an ammonia-producing component or the hydrolysis of a substance yielding gaseous ammonia.

The aldehyde may be added to the composition either by incorporating it into the alkali metal silicate solution directly, or by adding the aldehyde to the amide solution, then combining it with the alkali metal silicate to form the soil stabilizing composition. If storage of the reactants is required, incorporation of the aldehyde directly into the alkali metal silicate solution is not recommended because the silicate solution containing the aldehyde will gel. Preferably, the aldehyde is added to the amide component before the amide is added to the silicate or, if a reactive salt is to be used also, either to the reactive salt solution which is then added to the amide component, or to the amide-reactive salt solution. However, if desired, the aldehyde can be added separately to the alkali metal silicate solution at the same time that the amide is added, along with a reactive salt.

When the component capable of forming the aldehyde-ammonia compound is either formaldehyde, a liner polymer of formaldehyde, or a copolymer of formaldehyde, e.g., a carbohydrate-formaldehyde resin, the gel time of the soil stabilizing composition is increased. This increase in gel time is proportional to the amount of formaldehyde added; however, surprisingly, the increase is lessened when the formaldehyde is added to the amide solution rather than to the silicate solution. It has also been found that, when formaldehyde is combined with at least one of the other aldehydes disclosed hereinabove, the gel time is accelerated. For instance, when a formaldehyde-trioxane mixture is used, wherein at least 50 per cent of the formaldehyde-trioxane-added water content of the total stabilization composition comprises a trioxane solution containing 100 grams trioxane per liter of water, gelation times are accelerated (Example 5)

Gelation time is further accelerated when the reactive salt is present in the stabilizing composition in addition to the silicate and amide. This acceleration is proportional to the concentration of the reactive salt. The relationship between gel time and reactive salt concentration may easily be determined by any suitable test procedure. Once the relationship is determined for a given composition, the addition of specific amounts of reactive salt provides predictable gel times, thereby enabling the user of the composition of this invention to schedule operations accordingly.

The term "soil," as used in the specification and claims, is intended to refer to various types and compositions of soil, including sand, loam, porous or fissured rock and the like; for example, as described in pages 614 to 633 of vol. 12 of the Kirk-Othmer Encyclopedia of Chemical Technology.

In order that those skilled in the art may more completely understand the present invention and the preferred methods by which the same may be carried into effect, the following specific examples may be offered:

EXAMPLE 1

The ability of compositions of this invention to solidify soil and subsist without releasing ammonia vapors is demonstrated by the following test: samples of soil stabilizing compositions are pepared which contain from 0 to 15 percent by volume of either formalin (37% by weight formaldehyde, 12% by volume methyl alcohol, the remainder water), acetaldehyde, propionaldehyde, n-butyraldehyde, furfural, or propionaldehyde-acetaldehyde, propionaldehyde-trioxane, and trioxane-paraldehyde mixtures. The samples are prepared as follows:

(A) Into a 16-ounce wide-mouthed bottle are placed 175 g. (125 ml.) of sodium silicate, Grade 40

The presence of ammonia is determined by the observation of a blue color on the copper strip and in the gel around the strip, produced by the formation of a copper ammonium complex. The ammonia released from the composition by the hydrolysis of the formamide initially reacts with the available aldehyde present to form an aldehyde-ammonia compound, for example, in the case of formaldehyde, hexamethylenetetramine, until the aldehyde is consumed in the reaction and then the ammonia reacts with the copper strip to give a blue color.

Table I contains the results of daily observation of these samples, together with the observed gel time and the number of days required for the copper strip to be completely deteriorated at the interface of the atmosphere and the gel, causing it to separate at that point.

TABLE I

| Sample No. | Aldehyde | Method of Adding Aldehyde | Vol. Percent Aldehyde | Vol. Percent Water | Gel Time (Min.) | Days for Ammonia to Appear | Days for 100% of Top Surface of Grout to Turn Blue in Color | Days Before Copper Strip Separated |
|---|---|---|---|---|---|---|---|---|
| 1 | Formalin | To Silicate | 0 | 30 | 41 | <1 | 4 | 6 |
| 2 | do | do | 5 | 25 | 48 | 1 | 5 | 7 |
| 3 | do | do | 10 | 20 | 55 | 2 | 14 | 15 |
| 4 | do | do | 15 | 15 | 54 | 6 | 19 | 19 |
| 5 | Acetaldehyde | To H₂O—CaCl₂—CHONH₂ mixture. | 1 | 29 | 7 | 1 | 7 | 6 |
| 6 | do | do | 3 | 27 | 1 | 2 | 9 | >9 |
| 7 | Propionaldehyde | do | 2 | 28 | 1 | 4 | 9 | >9 |
| 8 | n-Butyraldehyde | do | 2 | 28 | 1 | 1 | 7 | 7 |
| 9 | Furfural | do | 2 | 28 | 3 | (¹) | (¹) | >13 |
| 10 | Propionaldehyde-acetaldehyde | do | 2 | 28 | 4 | 1 | 5 | 7 |
| 11 | Propionaldehyde-trioxane | do | 2 | 28 | 3 | 2 | 4 | 6 |
| 12 | Trioxane-paraldehyde | do | 2 | 28 | 1 | 1 | 4 | 3 |

¹ Could not be determined because of the brown masking effect of furfural.

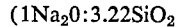

average solids content, 38.35% by weight, 41.5° Bé at 20° C.) and the formalin. The sodium silicate and formalin are thoroughly mixed. In a mixing cylinder are placed 25 ml. of calcium chloride solution (50 g. per liter), 25 ml. of formamide and water, which are mixed well and added to the sodium silicate-formalin mixture with rapid agitation at 80° F. The total volume of the samples is 250 ml. The resultant compositions contain, by volume, 50 percent sodium silicate solution, 10 percent formamide, 10 percent calcium chloride solution (50 g./l.) and the remainder aldehyde and water as indicated in Table I.

(B) The acetaldehyde, propionaldehyde, n-butyraldehyde, furfural, propionaldehyde-acetaldehyde, propionaldehyde-trioxane and trioxane-paraldehyde samples are prepared as in (A), except that these aldehydes are added to the water-calcium chloride-formamide mixture and are then mixed with the silicate The individual aldehydes are present in the aldehyde mixtures in equal amounts, by volume.

The compositions are allowed to gel at 70° F. and the time required for gelation is determined with a Mol-Rez Gel Time Meter (Mol-Rez Div. of The American Petrochemical Corp., Minneapolis, Minn.). Immediately after gelation, a copper strip, (0.002″ thick x 0.190″ wide x 2.005″ long), as defined in ASTM Method E–30–47 for use in combustion sulfur analysis in resistant-type furnaces, is inserted into each gelled sample, allowing about one inch of the strip to remain above the surface of the gel. The bottles are sealed tight with a screw top and stored at a temperature of 75° F. Daily observations are made for changes in color of the composition and the copper strip.

The early release of ammonia by the soil stabilizing composition containing no aldehyde is indicated by the data recorded on Sample No. 1. The addition of aldehyde prevents ammonia vapors from escaping the gel to attack the copper strip, as indicated by the data recorded on Sample Nos. 2 to 12. The time period during which ammonia vapors are not escaping varies depending on the aldehyde and the amount of aldehyde added. It is to be observed that the gel time is increased when formalin is added, whereas the gel time decreases when other aldehydes and mixtures of aldehydes are used.

EXAMPLE 2

A series of soil stabilizing compositions are prepared according to the method of Example 1, with the exception that the compositions contain, by volume, 50 percent sodium silicate solution, 12 percent formamide and 15 percent calcium chloride solution (50 g./l.); the remainder water and formalin. The formalin content of the samples varies from 0 to 20 percent by volume. The formalin is added to the composition in two different methods, as indicated in Table II; either by addition to the sodium silicate directly (Samples 14–22), or by addition to the water-calcium chloride solution-formamide mixture and then mixing with the silicate (Samples 23–31). The gel times are determined with a Mol-Rez Gel Time Meter, and the samples are sealed in a 16-ounce wide-mouthed bottle after the insertion of copper strips, as described in Example 1, into each recently gelled composition. The bottles are placed into a thermostatically-controlled water bath at 70° F. and maintained at that temperature and observed daily for change in appearance of the copper strip and the composition itself. Table II contains the results of the daily observations, together with the gel times observed, and water/formalin content of each sample.

TABLE II

| Sample No. | Aldehyde | Method of Adding Aldehyde | Vol. Percent Aldehyde | Vol. Percent Water | Gel Time (Min.) | Days for Ammonia to Appear | Days for 100% of Top Surface of Grout to Turn Blue in Color | Days Before Copper Strip Separated |
|---|---|---|---|---|---|---|---|---|
| 13 | | | 0 | 23 | 6 | <1 | 3-4 | 4 |
| 14 | Formalin | To Silicate | 4 | 19 | 11 | 1 | 4 | 4 |
| 15 | do | do | 6 | 17 | 11.5 | 1 | 5 | 8 |
| 16 | do | do | 8 | 15 | 11.5 | 2 | 6 | 13 |
| 17 | do | do | 10 | 13 | 15.5 | 4 | 13 | 13 |
| 18 | do | do | 12 | 11 | 17 | 5 | 16 | 17 |
| 19 | do | do | 14 | 9 | 18 | 7 | 20 | 22 |
| 20 | do | do | 16 | 7 | 25 | 8 | 27 | 28 |
| 21 | do | do | 18 | 5 | 28 | 23 | | >41 |
| 22 | do | do | 20 | 3 | 31 | 24 | | >41 |
| 23 | do | To $H_2O$—$CaCl_2$—$CHONH_2$ mixture | 4 | 19 | 12 | 1 | 9 | 8 |
| 24 | do | do | 8 | 15 | 11 | 2 | 6 | 9 |
| 25 | do | do | 10 | 13 | 12 | 3 | 10 | 12 |
| 26 | do | do | 12 | 11 | 11 | 5 | 12 | 14 |
| 27 | do | do | 14 | 9 | 16 | 6 | 17 | 17 |
| 28 | do | do | 15 | 8 | 12 | 9 | 22 | 22 |
| 29 | do | do | 16 | 7 | 14 | 9 | 20 | 22 |
| 30 | do | do | 18 | 5 | 20 | 18 | 35 | 35 |
| 31 | do | do | 20 | 3 | 18 | 24 | | >35 |

The lapse of time between gelation and the escape of ammonia vapors from the gel increases rapidly when the formalin concentration exceeds 15 percent by volume. The data contained in Table II indicates that an increase in formalin concentration from 16 percent to 20 percent results in approximately a tripling of the time period during which no ammonia vapor escapes from the gel.

The varied effect on gel time, occasioned by the method of incorporating formalin into the composition, is demonstrated by a comparison of the data contained in Table II, e.g. Samples 14 to 22 vs. Samples 23 to 31. While the gel time increases in each method, the increase is much less when the formalin is added to the calcium chloride-formamide solution.

EXAMPLE 3

To demonstrate the ability of aldehydes other than formaldehyde to control the release of ammonia from soil stabilizing compositions of this invention, soil stabilizing compositions are prepared containing 50 percent by volume sodium silicate ($1Na_2O:3.22SiO_2$ avg. solid content 38.35% by weight, 41.5° Bé. at 20° C.), 12 percent by volume formamide, 15 percent by volume calcium chloride solution (50 g./l.); the aldehydes and water are present in amounts as indicated in Table III. The aldehydes are added to the composition in two different methods, as indicated in the table; either by addition to the sodium silicate directly or by addition to the water-calcium chloride solution-formamide mixture. Paraformaldehyde dissolves freely in the sodium silicate solution; acetaldehyde and trioxane are soluble in water; propionaldehyde is sparingly soluble in water and the remainder of the aldehydes listed in Table V are insoluble in water. The paraformaldehyde, acetaldehyde and trioxane are soluble in the grout composition while the other aldehydes in Table III are only partially soluble. When the paraformaldehyde is added by the latter method (Sample 44), the mixture is slurried and quickly added to the silicate because the paraformaldehyde is substantially insoluble in the aqueous solution of the calcium chloride and formamide. This same technique is also used when the other aldehyde is insoluble or substantially insoluble in the mixture to which it is added. In Sample 50, the trioxane and paraldehyde are present in equal proportions by volume. The individual samples are prepared in 16-ounce glass bottles, the gel times are determined with a Mol-Rez Gel Time Meter, and are prepared for daily observation for ammonium release by inserting a copper strip, as described in Example 1, into the gel, sealing the bottle with a screw cap, and storing the samples at a temperature of between 70° F. to 75° F.

TABLE III

| Sample No. | Aldehyde | Method of Adding Aldehyde | Vol. Percent Aldehyde | Vol. Percent Water | Gel Time (Min.) | Days for Ammonia to Appear | Days for 100% of Top Surface of Grout to Turn Blue in Color | Days Before Copper Strip Separated |
|---|---|---|---|---|---|---|---|---|
| 32 | | | 0 | 23 | 6 | <1 | 3 | 4 |
| 33 | Acetaldehyde | To $H_2O$—$CaCl_2$—$CHONH_2$ | 1 | 22 | 1 | 1 | <9 | 8 |
| 34 | do | do | 3 | 20 | Instant | 2 | <9 | 9 |
| 35 | Propionaldehyde | do | 2 | 21 | Instant | 4 | <9 | >9 |
| 36 | do | do | 4 | 19 | Instant | 5 | >9 | >9 |
| 37 | do | do | 8 | 15 | Instant | 5 | >9 | >9 |
| 38 | n-Butyraldehyde | do | 5 | 18 | Instant | 2 | <9 | >9 |
| 39 | do | do | 10 | 13 | Instant | 2 | <9 | >9 |
| 40 | iso-Butyraldehyde | do | 5 | 18 | Instant | 2 | <9 | >9 |
| 41 | do | do | 10 | 13 | Instant | 2 | <9 | >9 |
| 42 | Benzaldehyde | do | 7 | 16 | Instant | 1 | <9 | >9 |
| 43 | o-Chlorobenzaldehyde | To $H_2O$—$CaCl_2$—$CHONH_2$ mixture | 10 | 13 | Instant | 1 | <9 | >9 |
| 44 | Paraformaldehyde | do | 1.4 | 21.6 | 10 | 1 | 9 | 10 |
| 45 | do | To the Silicate | 1.4 | 21.6 | 10 | 1 | 6 | 10 |
| 46 | do | do | 2.8 | 20.2 | 11 | 2 | 11 | >11 |
| 47 | do | do | 4.2 | 18.8 | 21 | 8 | | >11 |
| 48 | Paraldehyde | To $H_2O$—$CaCl_2$—$CHONH_2$ | 6 | 17 | Instant | 1 | <9 | 9 |
| 49 | Trioxane | do | 4 | 19 | Instant | 1 | <9 | >9 |
| 50 | Trioxane-paraldehyde | do | 2 | 21 | Instant | 1 | 4 | 4 |

EXAMPLE 4

This example demonstrates that a copolymer of formaldehyde and a carbohydrate, e.g. sucrose ($C_{12}H_{22}O_{11}$) is capable of controlling the release of ammonia from soil stabilizing compositions of this invention. The formaldehyde-sucrose resin is prepared by the addition to 45.9 g. (0.134 moles) of sucrose to 50 ml. of warm water, and agitating the solution with a mechanical stirrer at 80°–90° F. until the sucrose dissolves in the water.

The gel time of the individual samples is determined with a Mol-Rez Gel Time Meter, and the gels are prepared for daily observation for ammonium release by inserting a copper strip, as described in Example 1, into the gel, sealing the bottle with a screw cap, and storing the samples at a temperature of between 70° F. to 75° F. The results are reported in Table V, below. Also present in Table V is comparative data on tests made without the sucrose-formaldehyde (Sample 1) with formaldehyde alone (Sample 2) and with a sucrose solution (45.9 g. sucrose/75 ml. water) alone (Sample 51).

TABLE V

| Sample No. | Aldehyde | Sucrose Solution 45.9 g./75 ml. (Vol. Percent) | Vol. Percent Aldehyde | Vol. Percent Water | Gel Time (Min.) | Days for Ammonia to Appear | Days for 100% of top Surface of Grout to turn Blue in Color | Days Before Copper Strip Separated |
|---|---|---|---|---|---|---|---|---|
| 1 | | | | 30 | 41 | <1 | 4 | 6 |
| 2 | Formalin | | 5 | 25 | 48 | 1 | 5 | 7 |
| 51 | | 30 | | | 63 | <1 | 7 | 7 |
| 52 | Sucrose Formaldehyde Resin Dissolved in 40 ml. of $H_2O$. | | 28.4 of Run 1 Resin | 1.6 | 76 | <1 | 7 | 8 |
| 53 | ---do--- | | 29.2 of Run 2 Resin | 0.8 | 92 | 2 | 8 | 8 |
| 54 | ---do--- | | 30.4 of Run 3 Resin | | 102 | 2 | >8 | >8 |
| 55 | ---do--- | | 31.2 of Run 4 Resin | | 130 | 3 | >8 | >8 |

Ten milliliters (0.134 moles of formaldehyde) of formalin is added to the solution and stirring is continued for about 10 minutes. The solution is transferred to a distillation apparatus and the volatile material boiling below 70° C. at 10–20 mm. Hg. is removed. The cooled residue is a clear, solid resin and weighs 46.8 g. To the cooled resin is added 40 ml. of water and the mixture is heated to boiling to dissolve the resin. The volume of the cooled solution is 71 ml. and the solution weighs 86.8 g.

Additional sucrose-formaldehyde resins are made using mole ratios of 1:2, 1:3 and 1:4 of sucrose to formaldehyde by the above procedure. Summarization of the above data appears in Table IV.

The sucrose-formaldehyde resins extend the gel time considerably. The soil stabilizing composition, in the absence of any aldehyde additive (Sample 1), has a gel time of 41 minutes and, when the resin from Run No. 1 is added to the composition, the gel time is extended to 76 minutes (Sample 52). The higher ratios of formaldehyde to sucrose increase the gel time, and the gel time of the 4:1 resin gives a gel time of 130 minutes (Sample 55).

EXAMPLE 5

This example illustrates that the gel time of a soil stabilizing composition, containing formaldehyde, may

TABLE IV

| Run No. | Sucrose (g.) | Sucrose (moles) | Formalin (37% by wt. HCHO), ml. | Formaldehyde in formalin (moles) | Mole Ratio of Sucrose to Formaldehyde | Yield (Based on wt. Percent of Resin Product) |
|---|---|---|---|---|---|---|
| 1 | 45.9 | 0.134 | 10 | 0.134 | 1:1 | 94.0 |
| 2 | 45.9 | 0.134 | 20 | 0.268 | 1:2 | 90.5 |
| 3 | 45.9 | 0.134 | 30 | 0.402 | 1:3 | 92.0 |
| 4 | 45.9 | 0.134 | 40 | 0.536 | 1:4 | 91.5 |

To each of these resin solutions is added 0 to 4 ml. of water, 25 ml. of calcium chloride solution (50 g./l.) and 25 ml. of formamide as indicated in Table V. Each of these mixtures is then added to 175 g. of sodium silicate solution contained in a 16-ounce bottle and rapidly agitated at 80° F. for about 30 seconds. The resultant compositions contain, by volume, 50 percent sodium silicate solution, 10 percent formamide, 10 percent calcium chloride solution (50 g./1) and the remainder the sucrose-formaldehyde resin and water.

be accelerated by combining trioxane (cyclic trimer of formaldehyde, containing no free aldehyde groups) with the formaldehyde. The soil stabilizing compositions of this example are prepared according to the method of Example 1. Table VI contains the results of the daily observations, together with the gel times observed, and formaldehyde-trioxane content of each sample. The trioxane is added to the soil stabilizing composition as a water solution containing 100 grames of trioxane per liter.

TABLE VI

| Sample No. | Formalin (Vol. Percent) | Trioxane (Vol. Percent) | Water (Vol. Percent) | Gel Time (Min.) | Days for Ammonia to Appear | Days for 100% of Top Surface of Grout to Turn Blue in Color | Days for Copper Strip to become Separated |
|---|---|---|---|---|---|---|---|
| 1 | | | 30 | 41 | <1 | 4 | 6 |
| 4 | 15 | | 15 | 54 | 6 | 19 | 19 |
| 49 | | 4 | 19 | Instant | 1 | <9 | >9 |
| 56 | 6 | 16 | 8 | 17 | 2 | 11 | 12 |
| 57 | 15 | 15 | | 3 | 9 | 22 | 24 |
| 58 | 10 | 10 | 10 | 137 | 2 | 8 | 8 |
| 59 | 8 | 12 | 10 | 60 | 2 | 22 | 22 |

It will be observed that when 15 percent, by volume, formalin is present in the soil stabilizing composition, the gel time is 54 minutes, and when 16 and 15 percent, by volume, of a trioxane solution is combined with 6 and 15 percent, by volume of formaldehyde, respectively, the gel times are decreased to 17 and 3 minutes, respectively. When trioxane is the sole aldehyde additive, gelation is instantaneous. However, when less than 50 percent of the formaldehyde-trioxane-water mixture is trioxane, no decrease in gel time is observed (Sample Nos. 58 and 59). It is to be noted that the release of ammonia is controlled over the soil stabilizing composition which does not contain any aldehyde.

EXAMPLE 6

This example illustrates that ammonia control is achieved equally as well when no reactive salt is employed in the soil stabilization composition. The soil stabilization compositions are prepared according to the method of Example 1 with the exception that the compositions contain, by volume, 50 percent sodium silicate solution, 20 percent formamide and the remainder water and formalin. The formalin (37% by weight, formaldehyde 12% by volume methanol and the remainder water) is added to the formamide and mixed with the silicate. The gel times are determined with a Mol-Rez Gel Time Meter and the samples are sealed in a 16-ounce wide-mouthed bottle after the insertion of copper strips. The bottles are maintained within a temperature range of from about 70° to 90° F. Table VII contains the results of the daily observations, together with the gel times observed, and water/formalin content of each sample.

TABLE VII

| Sample No. | Vol. Percent Formalin | Vol. Percent Water | Gel Time (Min.) | Days for Ammonia to Appear | Days for 100% of Top Surface of Grout to Turn Blue in Color | Days Before Copper Strip Separated |
|---|---|---|---|---|---|---|
| 60 | 0 | 30 | 24 | <1 | 3 | 3 |
| 61 | 10 | 20 | 31 | 2 | 8 | 8 |
| 62 | 15 | 15 | 33 | 3 | >8 | >8 |

EXAMPLE 7

Test cylinders (1″ dia. x 4″ high), of sand are prepared using −60 mesh Ottawa silica sand impregnated with portions of a soil stabilizing composition prepared according to Example 1. Into a mold is placed approximately 16 ml. of the soil stabilizing composition, and then approximately 82 g. of −60 mesh Ottawa silica sand is added in four equal portions, puddling or kneading after each addition to wet the sand until the mold is filled. Three such test cylinders are prepared for each type of formalin sample prepared in Example 1. The test cylinders are compressed under 100 p.s.i. on a hydraulic compression tester and allowed to stand in the mold for 24 hours at 75° F. The test cylinders are removed from the mold and are tested for unconfined compression strength on a Universal Stability Compressor Machine, Soil Test Company, Model AP–170. Table VIII contains the results of the compression tests presented as an average of three test cylinders tested for each type of soil stabilizing composition of Example 1.

TABLE VIII

| Sample No. | Formalin, Vol. Percent | Water, Vol. Percent | Unconfined Compression Strength (p.s.i.g.), 24 hours |
|---|---|---|---|
| 1 | 0 | 30 | 162.5 |
| 2 | 5 | 25 | 175 |
| 3 | 10 | 20 | 185 |
| 4 | 15 | 15 | 167.5 |

The foregoing examples demonstrate the ability of an aldehyde to prevent the release of ammonia from alkali metal silicate soil stabilizing compositions. The period of time during which gaseous ammonia is prevented from being released is determined by the amount of aldehyde placed into the soil stabilizing composition. The unconfined compression strength of the sand cores impregnated with the soil stabilizing composition of this invention is higher 24 hours after treatment than the strength of those impregnated with a comparable soil stabilizing composition which does not contain an aldehyde.

The foregoing examples demonstrate the ability of an aldehyde, in the gelled soil stabilizing composition, to react with the gaseous ammonia as the latter is released by the hydrolysis of the amide. Because of this ability, only one addition of aldehyde to the soil stabilizing composition is necessary before it is used to impregnate the soil in order to combine with all of the gaseous ammonia which is continually being released from the gel. However, by simply limiting the amount of aldehyde added to the original soil stabilizing composition, temporary inhibition of ammonia release can readily be obtained.

It is to be understood that although the invention has been described with specific reference to particular embodiments thereof, it is not to be so limited, since changes and alterations therein may be made which are within the full intended scope of this invention as defined by the appended claims.

What is claimed is:

1. A composition of matter consisting essentially of from about 5 to 97 percent by volume of an aqueous alkali metal silicate containing from about 35 to 45 percent by weight of solids and having an alkali metal oxide to $SiO_2$ weight ratio of from about 1:3.0 to 1:4.0; from about 2 to about 30 percent by volume of an amide having the structure

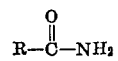

wherein R is selected from the group consisting of H, lower alkyl, —$CONH_2$ and lower alkyl-substituted amido groups; from about 1 to 30 percent by volume of at least one aldehyde compound selected from the group consisting of formaldehyde, linear polymers of formaldehyde and carbohydrate-formaldehyde resins, and the balance water.

2. A composition as in claim 1 wherein the amide is formamide.

3. A composition as in claim 1 wherein the alkali metal silicate is sodium silicate.

4. A composition as in claim 1 wherein the aldehyde compound is formaldehyde.

5. A composition as in claim 1 wherein the aldehyde compound is paraformaldehyde.

6. A composition as in claim 1 wherein the aldehyde compound is a sucrose-formaldehyde resin.

7. A composition of matter, as defined in claim 1, which additionally includes from about 5 to 20 percent by volume of an aqueous solution containing from about 25 grams per liter to saturation of a reactive salt capable of forming a substantially water-insoluble gel with said silicate.

8. A composition as in claim 7 wherein the reactive salt is calcium chloride.

9. The method of controlling the release of ammonia from an aqueous soil stabilizing composition consisting essentially of from about 5 to 97 percent by volume of an aqueous alkali metal silicate containing from about 35 to 45 percent by weight solids and having an alkali metal oxide to SiO₂ weight ratio of from about 1:3.0 to 1:4.0; from about 2 to 30 percent by volume of an amide having the structure

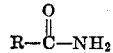

wherein R is selected from the group consisting of H, lower alkyl, —CONH₂ and lower alkyl-substituted amido groups, and water which method comprises the addition of from about 1 to 30 percent by volume of at least one additive compound selected from the group consisting of formaldehyde, linear polymers of formaldehyde and carbohydrate-formaldehyde resins.

10. A method, as defined in claim 9, wherein the additive compound is formaldehyde.

11. The method of claim 9, wherein the additive compound is paraformaldehyde.

12. The method of claim 9 wherein the additive is a sucrose-formaldehyde resin.

13. The method of claim 9 wherein the amide is formamide.

14. A method as in claim 9 wherein the soil stabilizing composition also contains about 5 to 20 percent by volume of an aqueous solution containing from about 25 grams per liter to saturation of a reactive salt capable of forming a substantially water-insoluble gel with said silicate.

15. The method according to claim 14, wherein the reactive salt is calcium chloride.

16. A composition of matter consisting essentially of about 35 to 75 percent, by volume, aqueous sodium silicate containing from about 35 to 45 percent solids by weight and having an Na₂O:SiO₂ weight ratio of about 1:3.0 to 4.0; about 5 to 20 percent, by volume, calcium chloride solution containing 50 grams calcium chloride per liter; about 2 to 15 percent by volume formamide; about 1 to about 30 percent, by volume, of at least one additive compound selected from the group consisting of formaldehyde, linear polymers of formaldehyde and carbohydrate-formaldehyde resins; and the balance being added water.

17. A composition of matter consisting essentially of 2 to about 30 parts amide having the structure

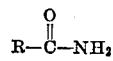

wherein R is selected from the group consisting of H, lower alkyl, —CONH₂ and lower alkyl-substituted amido groups, water and from about 1 to 30 parts of at least one compound selected from the group consisting of an aldehyde having the structure:

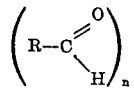

cyclic polymers of lower alkyl aldehydes having the structure:

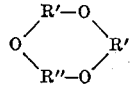

mixtures thereof, and a carbohydrate-formaldehyde resin, wherein R is selected from the group consisting of hydrogen and a hydrocarbon radical of from 1 to about 8 carbon atoms, and $n$ is a number from 1 to 100, inclusive; R′ is a lower alkyl radical of from 1 to 4 carbon atoms and R″ is a member selected from the group consisting of R′ and —R′—O—R′.

18. A composition of matter, as defined in claim 17, which additionally includes a reactive salt capable of forming a substantially water-insoluble gel with an alkali metal silicate.

19. Soil stabilized by admixture with a composition consisting essentially of about 35 to 75 percent by volume aqueous sodium silicate containing about 35 to 45 percent by weight solids and having an Na₂O:SiO₂ weight ratio of about 1:3.0 to 4.0, about 5 to 20 percent by volume calcium chloride solution, containing 50 g. calcium chloride per liter, about 2 to 15 percent by volume formamide, about 1 to 30 percent by volume of at least one compound selected from the group consisting of formaldehyde, linear polymers of formaldehyde and carbohydrate-formaldehyde resins; and the balance being added water.

References Cited by the Examiner

UNITED STATES PATENTS

| 2,069,486 | 2/1937 | Tilden | 106—74 |
| 2,968,572 | 1/1961 | Peeler | 106—287 |
| 3,149,985 | 9/1964 | Gandon | 106—287 |

UNITED STATES PATENTS

| 865,744 | 5/1961 | Great Britain. |

TOBIAS E. LEVOW, *Primary Examiner.*

S. E. MOTT, *Assistant Examiner.*